(12) United States Patent
Kageyama et al.

(10) Patent No.: US 12,163,061 B2
(45) Date of Patent: Dec. 10, 2024

(54) TWO-PACK CURABLE ADHESIVE COMPOSITION

(71) Applicant: THE YOKOHAMA RUBBER CO., LTD., Tokyo (JP)

(72) Inventors: Hirokazu Kageyama, Hiratsuka (JP); Kazushi Kimura, Hiratsuka (JP); Yutaro Yamamoto, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 646 days.

(21) Appl. No.: 17/279,974

(22) PCT Filed: Sep. 27, 2019

(86) PCT No.: PCT/JP2019/038406
§ 371 (c)(1),
(2) Date: Mar. 25, 2021

(87) PCT Pub. No.: WO2020/067534
PCT Pub. Date: Apr. 2, 2020

(65) Prior Publication Data
US 2022/0033696 A1    Feb. 3, 2022

(30) Foreign Application Priority Data
Sep. 28, 2018 (JP) .................. 2018-185940

(51) Int. Cl.
*C09J 175/12* (2006.01)
*C08G 18/10* (2006.01)
(Continued)

(52) U.S. Cl.
CPC ............ *C09J 175/12* (2013.01); *C08G 18/10* (2013.01); *C08G 18/324* (2013.01); *C08G 18/44* (2013.01); *C08G 18/4845* (2013.01)

(58) Field of Classification Search
CPC ..................................... C09J 175/12
See application file for complete search history.

(56) References Cited

U.S. PATENT DOCUMENTS 4,621,113 A * 11/1986 Collins .................. C08G 18/10
524/196
2008/0210132 A1* 9/2008 Ohori .................. C08G 18/4238
560/330
(Continued)

FOREIGN PATENT DOCUMENTS

JP    2003137963 A  *  5/2003
JP    2006-291060 A    10/2006
(Continued)

OTHER PUBLICATIONS

JP-2003137963-A_May 2003_English Translation.*

*Primary Examiner* — Michael L Leonard
(74) *Attorney, Agent, or Firm* — Carrier, Shende & Associates P.C.; Joseph P. Carrier; Fulchand P. Shende

(57) ABSTRACT

The two-part curable adhesive composition contains a main agent (A) containing a urethane prepolymer (a1) and a residual polyisocyanate (a2), and a curing agent (B) containing a polyol compound (b1) and a polyamine compound (b2). The urethane prepolymer (a1) is made by reacting in an equivalent ratio of an isocyanate group in a raw material polyisocyanate to a hydroxy group in a polycarbonate polyol being 2.05 or greater. The equivalent ratio of an isocyanate group in the main agent (A) to an active hydrogen group in the curing agent (B) is from 0.5 to 4.

18 Claims, 1 Drawing Sheet

(51) Int. Cl.
*C08G 18/32* (2006.01)
*C08G 18/44* (2006.01)
*C08G 18/48* (2006.01)

(56) References Cited

U.S. PATENT DOCUMENTS

2012/0295104 A1* 11/2012 Barker ............... C08G 18/1808
                                                    524/789
2013/0059973 A1   3/2013 Wamprecht et al.
2016/0153559 A1*  6/2016 Duggal .................... F16J 9/28
                                                    528/65
2019/0136105 A1   5/2019 Abe et al.

FOREIGN PATENT DOCUMENTS

| JP | 2008-285582 A | 11/2008 |
| JP | 2010-047697 A | 3/2010 |
| JP | 2013-527281 A | 6/2013 |
| JP | 2017-218539 A | 12/2017 |
| JP | 2018-135491 A | 8/2018 |
| WO | 2006/115138 A1 | 11/2006 |
| WO | 2017/006650 A1 | 1/2017 |

* cited by examiner (a)
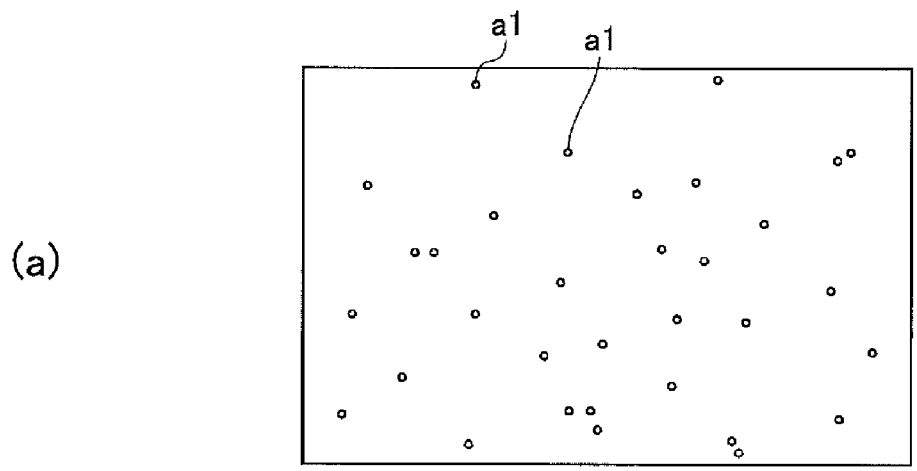
(b)
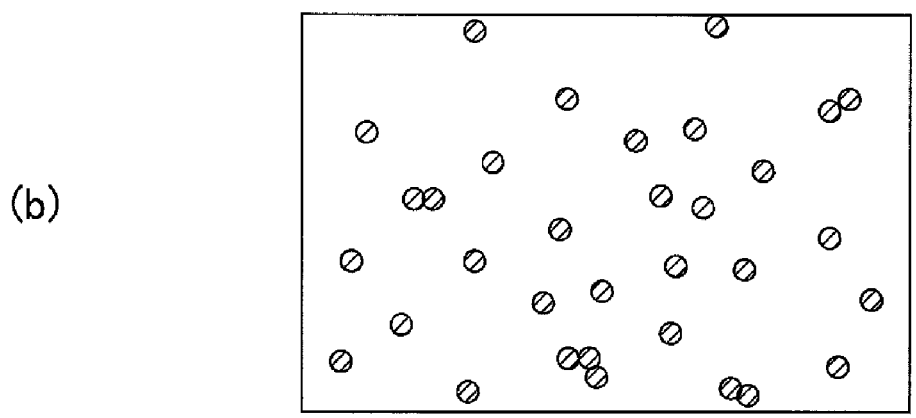
(c)
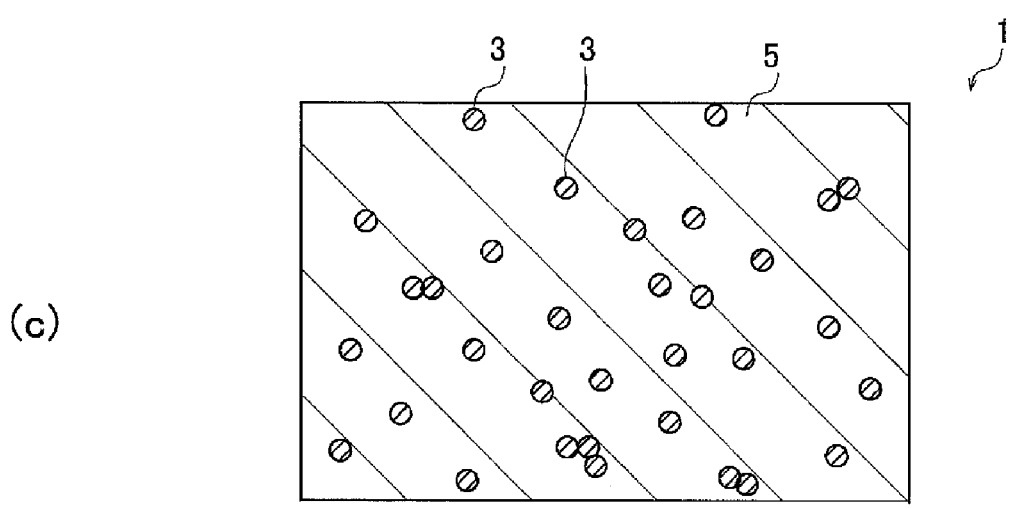

TWO-PACK CURABLE ADHESIVE COMPOSITION

TECHNICAL FIELD

The present invention relates to a two-part curable adhesive composition having a main agent and a curing agent.

BACKGROUND ART

For structures such as bodies of automobiles, components formed from different materials may be bonded using adhesives. By bonding using adhesives, even when a difference in coefficients of thermal expansion of components is large, occurrence of strain and warp is suppressed. Meanwhile, an adhesive for such use is required to have excellent tensile properties including good strength at break and elongation at break once the adhesive is in a cured state.

As an adhesive composition having excellent elongation at break, a two-part curable adhesive composition containing a main agent containing a urethane prepolymer, and a curing agent has been known. In a two-part curable adhesive composition, typically, a compounded ratio of a main agent to a curing agent is adjusted such that an equivalent ratio of an isocyanate group contained in the main agent to a hydroxy group in polyols contained in the curing agent is approximately 1. However, when the amounts of the isocyanate group and the hydroxy group are close to equal, the curing rate of the urethane prepolymer becomes significantly slow. Therefore, an increase of the curing rate has been attempted by using a catalyst such as organometal compounds and tertiary amines (Patent Document 1).

CITATION LIST

Patent Document

Patent Document 1: JP 2017-218539 A

SUMMARY OF INVENTION

Technical Problem

When curing of the adhesive composition is made fast by using the catalyst described above, foaming may occur, and by this, problems of decrease in tensile properties of the cured product may arise. Furthermore, by allowing the mixing ratio of a main agent to a curing agent to be deviated from a set value, predetermined physical properties of the cured product may not be achieved, and the tensile properties such as strength at break and elongation at break may be deteriorated.

An object of the present invention is to provide a two-part curable adhesive composition that suppresses foaming, provides its cured product having excellent strength at break and elongation at break, and has less effect on strength at break and elongation at break of the cured product even when a mixing ratio of a main agent to a curing agent is deviated from a set value.

Solution to Problem

An aspect of the present invention is a two-part curable adhesive composition including a main agent (A) containing a urethane prepolymer (a1), and a curing agent (B) containing a polyol compound (b1) and a polyamine compound (b2), the urethane prepolymer (a1) being made by reacting a raw material polyisocyanate and a polycarbonate polyol in an equivalent ratio of an isocyanate group in the raw material polyisocyanate to a hydroxy group in the polycarbonate polyol being 2.05 or greater, with all of the polycarbonate polyol turning to a monomer unit for the urethane prepolymer (a1), the main agent (A) further containing, in addition to the urethane prepolymer (a1), a residual polyisocyanate (a2) which is a remainder of the raw material polyisocyanate that did not react with the polycarbonate polyol, and an equivalent ratio of an isocyanate group in the main agent (A) to an active hydrogen group in the curing agent (B) being from 0.5 to 4.

Preferably, an equivalent ratio of an active hydrogen group in the polyamine compound (b2) to an active hydrogen group in the polyol compound (b1) is preferably from 1.5 to 6.

A number average molecular weight of the polycarbonate polyol is preferably 500 or greater.

A number average molecular weight of the polyol compound (b1) is preferably 500 or greater.

The polyol compound (b1) preferably contains at least one selected from the group consisting of a monomer unit of polyethylene glycol and a monomer unit of polypropylene glycol in each molecule.

The polyamine compound (b2) preferably has a number average molecular weight of less than 500 and preferably has at least two amino groups and at least one aromatic group in each molecule.

The main agent (A) preferably contains at least one selected from the group consisting of a filler, an anti-aging agent, a coloring agent, a viscosity modifier, and a plasticizer.

The curing agent (B) preferably contains at least one selected from the group consisting of a filler, an anti-aging agent, a coloring agent, a viscosity modifier, a plasticizer, and a polyhydric alcohol having a number average molecular weight of less than 500.

Preferably, a cured product obtained by curing the two-part curable adhesive composition has a tensile strength of 15 MPa or greater and an elongation at break of 150% or greater, as determined in accordance with JIS K6251.

Preferably, a cured product obtained by curing the two-part curable adhesive composition has a modulus of elasticity in tension of 50 MPa or greater.

A mass ratio of the main agent (A) to the curing agent (B) is preferably from 3:7 to 7:3, and more preferably from 4:6 to 6:4.

The two-part curable adhesive composition has a workable life of preferably from 30 seconds to 10 minutes.

Another aspect of the present invention is a two-part curable adhesive composition including a main agent (A) containing a urethane prepolymer (a1), and a curing agent (B) containing a polyol compound (b1) and a polyamine compound (b2), the urethane prepolymer (a1) being made by reacting a raw material polyisocyanate and a polycarbonate polyol in an equivalent ratio of an isocyanate group in the raw material polyisocyanate to a hydroxy group in the polycarbonate polyol, the equivalent ratio being adjusted such that a cured product obtained by curing the two-part curable adhesive composition has a tensile strength of 15 MPa or greater and an elongation at break of 150% or greater in accordance with JIS K6251, with all of the polycarbonate polyol turning to a monomer unit for the urethane prepolymer (a1), the main agent (A) further containing, in addition to the urethane prepolymer (a1), a residual polyisocyanate (a2) which is a remainder of the raw material polyisocyanate that did not react with the polycarbonate polyol, and an equivalent ratio of an isocyanate group in the main agent (A) to an active hydrogen group in the curing agent (B) being from 0.5 to 4.

Another aspect of the present invention is a method of producing a two-part curable adhesive composition, the method including:

manufacturing a main agent (A) containing a urethane prepolymer (a1), and manufacturing a curing agent (B) containing a polyol compound (b1) and a polyamine compound (b2), in the manufacturing of the main agent (A), the urethane prepolymer (a1) being manufactured by reacting a raw material polyisocyanate and a polycarbonate polyol in an equivalent ratio of an isocyanate group in the raw material polyisocyanate to a hydroxy group in the polycarbonate polyol being 2.05 or greater, with all of the polycarbonate polyol turning to a monomer unit for the urethane prepolymer (a1), the main agent (A) further containing, in addition to the urethane prepolymer (a1), a residual polyisocyanate (a2) which is a remainder of the raw material polyisocyanate that did not react with the polycarbonate polyol, and an equivalent ratio of an isocyanate group in the main agent (A) to all active hydrogen groups in the curing agent (B) being from 0.5 to 4.

Advantageous Effects of Invention

According to the two-part curable adhesive composition of the embodiments described above, foaming can be suppressed, a cured product which has excellent strength at break and elongation at break and in which less effect occurs on strength at break and elongation at break of the cured product even when a mixing ratio of a main agent to a curing agent is deviated from a set value can be obtained.

BRIEF DESCRIPTION OF DRAWINGS

FIGS. 1(a) to 1(c) are FIGURES conceptually illustrating a curing reaction of an adhesive composition.

DESCRIPTION OF EMBODIMENTS

The two-part curable adhesive composition of the present embodiment will be described below. The present embodiment includes various embodiments described below.

Adhesive Composition

The two-part curable adhesive composition of the present embodiment (hereinafter, also simply referred to as "adhesive composition") contains a main agent (A) and a curing agent (B).

Main Agent (A)

The main agent (A) contains a urethane prepolymer (a1).

The urethane prepolymer (a1) is made by reacting a raw material polyisocyanate and a polycarbonate polyol. That is, the urethane prepolymer (a1) has a monomer unit of polyisocyanate and a monomer unit of polycarbonate polyol. Specifically, this reaction is performed in a manner that the equivalent ratio of an isocyanate group in a raw material polyisocyanate to a hydroxy group in a polycarbonate polyol (hereinafter, also referred to as "index") is 2.05 or greater and all of the polycarbonate polyol turns to a monomer unit for the urethane prepolymer (a1).

By setting the index to 2.05 or greater, a cured product having excellent strength at break, specifically a cured product having a strength at break of 15 MPa or greater, can be obtained. In the present specification, the strength at break refers to a tensile strength in accordance with JIS K6251.

Furthermore, by setting the index to be 2.05 or greater and setting an excessively large amount of the isocyanate groups with respect to the amount of the hydroxy groups, a component that is different from the polycarbonate polyol, specifically, the polyol compound (b2) described below, can be adequately reacted with the remaining isocyanate groups. By this, a cured product having excellent elongation at break, specifically, a cured product having an elongation at break of 150% or greater, can be obtained. That is, by setting the index to 2.05 or greater, a cured product having a strength at break of 15 MPa or greater and an elongation at break of 150% or greater can be obtained. In the present specification, the elongation at break refers to an elongation at break in accordance with JIS K6251.

Note that, by the adhesive composition of the present embodiment, a product obtained by adding the polyisocyanate to the polycarbonate polyol and then reacting with active hydrogen groups of the curing agent (B) and a product obtained by reacting the remained polyisocyanate that did not react with the polycarbonate polyol with active hydrogen groups of the curing agent (B) are formed, and a polymer blend in which polymer phases with different properties coexist can be obtained. This polymer blend has an islands-in-the-sea structure, in which the urethane prepolymer (a1) is islands (dispersed phase) and the polymer obtained by reacting the remained isocyanate groups and the curing agent (B) is sea (continuous phase).

The equivalent ratio is preferably 3 or greater, and more preferably 4 or greater. Meanwhile, when the equivalent ratio is too large, the elongation at break may become too low. Therefore, it is preferable that the equivalent ratio is 12 or less, and preferably 10 or less.

The raw material polyisocyanate is not particularly limited as long as the raw material polyisocyanate has two or more isocyanate groups in each molecule. As the raw material polyisocyanate, a known polyisocyanate compound can be used.

Specific examples of the polyisocyanate compound used for the raw material polyisocyanate include aromatic polyisocyanates such as TDI (e.g. 2,4-tolylene diisocyanate (2,4-TDI) and 2,6-tolylene diisocyanate (2,6-TDI)), MDI (e.g. 4,4'-diphenylmethane diisocyanate (4,4'-MDI) and 2,4'-diphenylmethane diisocyanate (2,4'-MDI)), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic polyisocyanates such as pentamethylene diisocyanate (PDI), hexamethylene diisocyanate (HDI), trimethylhexamethylene diisocyanate (TMHDI), lysine diisocyanate, and norbornane diisocyanate (NBDI); alicyclic polyisocyanates such as transcyclohexane-1,4-diisocyanate, isophorone diisocyanate (IPDI), bis(isocyanate methyl)cyclohexane ($H_6XDI$), and dicyclohexylmethane diisocyanate ($H_{12}MDI$); carbodiimide-modified polyisocyanates thereof; and isocyanurate-modified polyisocyanates thereof.

Such polyisocyanate may be used alone, or a combination of two or more types of these polyisocyanates may be used.

Among these, an aromatic polyisocyanate is preferable, and MDI is more preferable from the perspective of excellent curability.

The polycarbonate polyol is a polyol having primary hydroxy groups at both terminals and having a carbonate structure in a repeating unit, and a known polycarbonate polyol can be used without particular limitation.

The number average molecular weight of the polycarbonate polyol is preferably 500 or greater. When the number average molecular weight of the polycarbonate polyol is less than 500, the elongation at break of the cured product is reduced, and the cured product may become too hard. Furthermore, even when the equivalent ratio (NCO group/active hydrogen ratio) described below is adjusted, adjustment of a modulus of elasticity in tension (hereinafter, also simply referred to as "elastic modulus") of the cured product becomes difficult. The upper limit value of the number average molecular weight of the polycarbonate polyol is, for example, 3000.

The number average molecular weight of the urethane prepolymer (a1) is preferably from 1000 to 15000, and more preferably from 1000 to 10000.

Note that the number average molecular weight is a number average molecular weight (based on calibration with polystyrene) measured by gel permeation chromatography (GPC), and for the measurement, use of tetrahydrofuran (THF) and/or N,N-dimethylformamide (DMF) as a solvent is preferred.

The main agent (A) further contains a residual polyisocyanate (a2) in addition to the urethane prepolymer (a1).

The residual polyisocyanate (a2) is a remainder of the raw material polyisocyanate that did not react with the polycarbonate polyol. By allowing the main agent (A) to contain the residual polyisocyanate (a1), reaction with the curing agent (B) can be quickly performed. In this way, the curing time can be shortened, and foaming caused by a reaction of the residual polyisocyanate (a1) and moisture can be suppressed.

Curing Agent (B)

The curing agent (B) contains a polyol compound (b1) and a polyamine compound (b2).

By allowing the curing agent (B) to contain the polyol compound (b1), the elongation at break of the cured product can be enhanced. Furthermore, the polyol compound (b1) gradually reacts with a polyisocyanate compared to the polyamine compound (b2), and thus does not lead to an excessively short curing time and contributes to enhancement of workability.

The polyol compound (b1) is not particularly limited as long as the polyol compound (b1) has two or more hydroxy groups in each molecule, and a known polyol compound can be used. Specific examples of the polyol compound include low-molecular-weight polyhydric alcohols, polyether polyols, polyester polyols, other types of polyols, and polyol mixtures thereof.

Specific examples of the low-molecular-weight polyhydric alcohols include low-molecular-weight polyols such as ethylene glycol (EG), diethylene glycol, propylene glycol (PG), dipropylene glycol, 1,3-butanediol, 1,4-butanediol, pentanediol, neopentyl glycol, hexanediol, cyclohexanedimethanol, glycerin, 1,1,1-trimethylolpropane (TMP), 1,2,5-hexanetriol, and pentaerythritol; sugars such as sorbitol; and the like.

Examples of the polyether polyols include polyols obtained by adding at least one type selected from styrene oxide and/or alkylene oxides such as ethylene oxide, propylene oxide, butylene oxide (tetramethylene oxide), and tetrahydrofuran, to at least one type selected from the compounds that are exemplified as the low-molecular-weight polyhydric alcohols described above.

Specific examples of the polyether polyol include polyethylene glycol, polypropylene glycol (PPG), polypropylene triol, ethylene oxide/propylene oxide copolymers, polytetramethylene ether glycol (PTMG), polytetraethylene glycol, and sorbitol polyol.

Likewise, examples of the polyester polyol include the condensation products (condensed polyester polyols) of any of the low-molecular-weight polyhydric alcohols with a polybasic carboxylic acid; lactone polyols; and polycarbonate polyols.

Specific examples of the polybasic carboxylic acids which may be used here to form the condensed polyester polyol include glutaric acid, adipic acid, azelaic acid, fumaric acid, maleic acid, pimelic acid, suberic acid, sebacic acid, phthalic acid, terephthalic acid, isophthalic acid, dimer acid, pyromellitic acid, other low-molecular-weight carboxylic acids, oligomeric acids, castor oil, and hydroxycarboxylic acids such as a reaction product of castor oil with ethylene glycol (or propylene glycol).

In addition, specific examples of the lactone polyols include compounds that are obtained by ring-opening polymerization of a lactone such as F-caprolactone, α-methyl-F-caprolactone, or F-methyl-F-caprolactone with a suitable polymerization initiator, and that have hydroxy groups at both ends.

Specific examples of other polyols include polymeric polyols having carbon-carbon bonds on a main-chain skeleton, such as acrylic polyols, polybutadiene diols, and hydrogenated polybutadiene polyols.

For the polyol compound (b1), various polyol compounds exemplified above may be used alone or may be used in a combination of two or more types.

The polyol compound (b1) may contain a polycarbonate polyol.

The number average molecular weight of the polyol compound (b1) is preferably 500 or greater. When the number average molecular weight of the polyol compound (b1) is less than 500, the elongation at break of the cured product is reduced, and the cured product may become too hard.

The polyol compound (b1) preferably contains at least one of polyethylene glycols and/or polypropylene glycols. Furthermore, of the polyol compound (b1), a proportion of the polyol compound having primary hydroxy groups at terminals is preferably 50% or greater in all the polyol compound (b1).

Because the polyamine compound (b2) exhibits high reaction rate in a reaction with the polyisocyanate, the reaction with the residual polyisocyanate (a2) progresses rapidly. Furthermore, because of heat build-up caused by the reaction between the polyamine compound (b2) and the residual polyisocyanate (a2), a following reaction of the polyol compound (b1) and the residual polyisocyanate (a2) is promoted. In this way, curing time is shortened, and an effect of shortening workable life is achieved.

The polyamine compound (b2) is not particularly limited as long as the polyamine compound (b2) has two or more amino groups in each molecule, and a known polyamine compound can be used.

Specific examples of the polyamine compound (b2) include aliphatic polyamines such as ethylenediamine, propylenediamine, butylenediamine, diethylenetriamine, triethylenetriamine, triethylenetetramine, tetraethylenepentamine, pentaethylenehexamine, hexamethylenediamine, trimethylhexamethylenediamine, 1,2-propanediamine, iminobispropylamine, methyliminobispropylamine, and 1,5-diamino-2-methylpentane (MPMD, available from Dupont K.K.); aromatic polyamines such as meta-phenylenediamine, ortho-phenylenediamine, para-phenylenediamine, m-xylylenediamine (MXDA), diaminodiphenyl methane, diaminodiphenyl sulfone, diamino diethyldiphenylmethane, diethylmethylbenzenediamine, 2-methyl-4,6-bis(methylthio)-1,3-benzenediamine, 4,4'-methylenebis(2-chloroaniline), 4,4'-methylenebis(3-chloro-2,6-diethylaniline), trimethylene bis(4-aminobenzoate), and bis(4-amino-2,3-dichlorophenyl)methane; N-aminoethylpiperazine; monoamine having an ether bond in its main chain, such as 3-butoxyisopropylamine; diamines having a polyether backbone, that is exemplified by JEFFAMINE EDR148 available from Sun Techno Chemicals Co., Ltd.; alicyclic polyamines such as isophoronediamine, 1,3-bisaminomethylcyclohexane (1,3BAC, available from Mitsubishi Gas Chemical Company, Inc.), 1-cyclohexylamino-3-aminopropane, and 3-aminomethyl-3,3,5-trimethyl-cyclohexylamine; diamines having a norbornane backbone, such as norbornanediamine (NBDA, available from Mitsui Chemicals, Inc.); polyamide amines having an amino group at a molecular end of polyamide; 2,5-dimethyl-2,5-hexamethylene diamine, menthenediamine, 1,4-bis(2-amino-2-methylpropyl)piperazine, JEFFAMINE D230 and JEFFAMINE D400, available from Sun Techno Chemicals Co., Ltd., having polypropylene glycol (PPG) as a backbone. These polyamine compounds may be used alone or may be used in a combination of two or more types.

From the perspective of increasing the reaction rate with the residual polyisocyanate (a2), the polyamine compound (b2) preferably has a number average molecular weight of less than 500 and preferably has at least two amino groups and at least one aromatic group in each molecule.

The equivalent ratio of the amino groups in the polyamine compound (b2) to the hydroxy groups in the polyol compound (b1) (hereinafter, also referred to as "amino group/hydroxy group ratio") is preferably from 1.5 to 6. In this way, the workable life of the adhesive composition can be made to a more appropriate duration. The equivalent ratio is preferably from 2 to 6.

In the adhesive composition of the present embodiment, the equivalent ratio of the isocyanate group in the main agent (A) to the active hydrogen group in the curing agent (B) (hereinafter, also referred to as "NCO group/active hydrogen group ratio") is from 0.5 to 4. The active hydrogen groups refer to hydroxy groups in the polyol compound (b1) and amino groups in the polyamine compound (b2). The isocyanate group in the main agent (A) refers to isocyanate group in the urethane prepolymer (a1) and the residual polyisocyanate (a2).

When the NCO group/active hydrogen group ratio is varied in a range of 0.5 to 4, the elastic modulus can be adjusted without significantly changing the strength at break and elongation at break of the cured product. Therefore, depending on the use, by adjusting the NCO group/active hydrogen group ratio, a target elastic modulus can be achieved. Meanwhile, even when the NCO group/active hydrogen group ratio is changed, the strength at break and elongation at break of the cured product do not significantly change. Specifically, the percentages of change of the strength at break and elongation at break are suppressed to not greater than ±20% relative to the strength at break and elongation at break of the cured product manufactured by mixing the main agent (A) and the curing agent (B) in a mixing ratio (mass ratio) of a set value (e.g. 1:1). As described above, even when the mixing ratio of the main agent (A) to the curing agent (B) is deviated from the set value, the strength at break and elongation at break of the cured product do not change significantly, and thus the elastic modulus can be adjusted while the high strength at break and elongation at break are maintained.

When the NCO group/active hydrogen group ratio is greater than 4, while the elastic modulus of the cured product becomes high, the elongation at break becomes excessively small, and the cured product becomes excessively hard. When the NCO group/active hydrogen group ratio is less than 0.5, while the elongation at break of the cured product becomes high, the elastic modulus becomes excessively small, and the cured product becomes excessively flexible.

The mass ratio of the main agent (A) to the curing agent (B) is preferably from 3:7 to 7:3. According to the adhesive composition of the present embodiment, even when the mixing ratio of the main agent (A) to the curing agent (B) is, for example, deviated by such a range from 1:1, the effect on the strength at break and elongation at break of the cured product is significantly small as described above.

The main agent (A) and the curing agent (B) described above each may contain, if necessary, various additives such as fillers, curing catalysts, plasticizers, anti-aging agents, antioxidants, pigments (dyes), thixotropic agents, ultraviolet absorbers, flame retardants, surfactants (including leveling agents), dispersing agents, dehydrating agents, adhesion promoters, and antistatic agents, in a range that does not impair the object of the present invention.

Specifically, the main agent (A) preferably contains at least one selected from the group consisting of fillers, anti-aging agents, coloring agents, viscosity modifiers, and plasticizers.

Specifically, the curing agent (B) preferably contains at least one selected from the group consisting of fillers, anti-aging agents, coloring agents, viscosity modifiers, plasticizers, and polyhydric alcohols having a number average molecular weight of less than 500. As the polyhydric alcohols having a number average molecular weight of less than 500, for example, the low-molecular-weight polyhydric alcohols described above can be used.

A catalyst such as an organometal compound or a tertiary amine is not necessary for the adhesive composition. That is, according to an embodiment, the adhesive composition preferably contains no catalyst such as an organometal compound or a tertiary amine.

With reference to FIG. 1, the curing reaction of the adhesive composition will be described. FIG. 1 is FIGURES conceptually explaining a curing reaction of the adhesive composition. From the time of mixing the two parts, as the curing reaction progresses, the adhesive composition cures in any one of a state illustrated in (a) in which the main agent and the curing agent are substantially miscible to a state illustrated in (c) that is like a microphase separation. The state of (a) is almost transparent and practically in a dissolved state but also includes a state where spherocrystals having urethane hard segments as cores and/or particles in a nanometer size are produced (indicated by the sign a1). The state of (c) schematically illustrates a phase separation state that is called an islands-in-the-sea structure and schematically illustrates a state where the polycarbonate polyol, which is a crystalline polyol, undergoes phase separation and grows to be a microparticle 3 in a micrometer size. Note that the state of (b) illustrates an intermediate state between the state of (a) and the state of (c). In many cases, the adhesive composition of the present embodiment reaches the state of (b) or the state of (c) from the state of (a) (or the state of (b)) as the curing progresses; however, in some cases, the substantially identical state is maintained immediately after the mixing. Note that, in FIG. 1(c), a continuous phase of the islands-in-the-sea structure is represented by the reference sign 5, and a cured product is represented by the reference sign 1.

According to the adhesive composition of the present embodiment, foaming can be suppressed, a cured product having excellent strength at break and elongation at break can be obtained, and less effect occurs on the strength at break and elongation at break of the cured product when the mixing ratio of the main agent to the curing agent is deviated from a set value. Specifically, as the cured product having excellent tensile properties, a cured product having a strength at break of 15 MPa or greater and an elongation at break of 150% or greater can be obtained. With such tensile properties, the strength at break is at equivalent or to a degree that corresponds to the strength at break of an epoxy resin-based adhesive while the elongation at break is equivalent to that of a polyurethane-based adhesive in the related art. Furthermore, according to the adhesive composition of the present embodiment, a cured product having the elastic modulus of 50 MPa or greater is obtained. The cured product having the tensile properties described above is suitable for bonding components of structures, such as bodies of automobiles.

The strength at break is preferably 20 MPa or greater, and more preferably 25 MPa or greater. The upper limit value of the strength at break is not particularly limited and, for example, is approximately 100 MPa.

The elongation at break is preferably 200% or greater, and more preferably 250% or greater. The upper limit value of the elongation at break is not particularly limited and, for example, is approximately 500%.

The elastic modulus is preferably 50 MPa or greater, and more preferably 100 or greater. The upper limit value of the elastic modulus is not particularly limited, and, for example, is approximately 450 MPa.

Note that the elastic modulus can be determined by the modulus of elasticity in tension (MPa) in accordance with JIS K7161 except, for strains $\varepsilon 1$ and $\varepsilon 2$, $\varepsilon 1$ is set to 0% and $\varepsilon 2$ is set to 2.0%. Specifically, when $\sigma 1$ and $\sigma 2$ are stresses (MPa) corresponding to the strains at these two points, the elastic modulus is a value obtained by dividing a difference of stresses ($\sigma 2$-$\sigma 1$) by a difference of strains ($\varepsilon 2$-$\varepsilon 1$).

According to the present embodiment, the workable life of the adhesive composition is from 30 seconds to 10 minutes. Because the workable life is 10 minutes or less, excellent workability is achieved, and foaming can be suppressed. Because the workable life is 30 seconds or more, the curing time is not excessively short, and excellent workability is achieved. The workable life refers to a time period from the time at which mixing of the main agent (A) and the curing agent (B) is started to the time at which handling becomes impossible.

The workable life is preferably not longer than 7 minutes, and more preferably not longer than 5 minutes.

According to the adhesive composition of the present embodiment, the flow starting temperature of the cured product is 130° C. or higher, and preferably 150° C. or higher, a cured product having excellent heat resistance is obtained. The flow starting temperature is measured by using a flow tester.

The adhesive composition of the present embodiment is used for bonding components of various structures, which are not limited to, for example, bodies of automobiles.

Furthermore, the adhesive composition of the present embodiment can be used as, for example, a coating material, a waterproof material, a floor material, an elastomer, an artificial leather, and spandex, in addition to an adhesive.

Method of Producing Adhesive Composition

The method of producing the adhesive composition of an embodiment includes a step of manufacturing a main agent (A) and a step of manufacturing a curing agent (B).

In the step of manufacturing the main agent (A), a urethane prepolymer (a1) is made by reacting a raw material polyisocyanate and a polycarbonate polyol in a manner that the isocyanate group in the raw material polyisocyanate is in an amount greater than the amount of the hydroxy group in the polycarbonate polyol so that all of the polycarbonate polyol turns to a monomer unit for the urethane prepolymer (a1). By this, the main agent (A) containing the urethane prepolymer (a1) and the residual polyisocyanate (a2) is manufactured. Note that the raw material polyisocyanate, the polycarbonate polyol, the urethane prepolymer (a1), and the residual polyisocyanate (a2) are, respectively, configured identical to the raw material polyisocyanate, the polycarbonate polyol, the urethane prepolymer (a1), and the residual polyisocyanate (a2) described above.

The index during manufacturing of the urethane prepolymer (a1) is adjusted in a manner that the tensile strength of the cured product obtained by curing the two-part curable adhesive composition becomes 15 MPa or greater and the elongation at break becomes 150% or greater, determined in accordance with JIS K6251. In other words, the index is adjusted to 2.05 or greater.

In the step of manufacturing the curing agent (B), the curing agent (B) containing a polyol compound (b1) and a polyamine compound (b2) is manufactured. At this time, the equivalent ratio of isocyanate groups in the main agent (A) to active hydrogen groups in the curing agent (B) is adjusted to from 0.5 to 4. Note that the polyol compound (b1) and the polyamine compound (b2) are, respectively, configured identical to the polyol compound (b1) and the polyamine compound (b2) described above.

Using the production method described above, the adhesive composition described above can be manufactured.

Experiment

To study the effects of the embodiments of the present invention, adhesive compositions were produced based on the blended amounts listed in Table 1 and Table 2, and strength at break, elongation at break, workable life, and foamability were measured.

Urethane prepolymers 1 to 4 were produced as described below, additives listed in Tables were added, and main agents were produced. Furthermore, the raw materials listed in Tables were mixed, and thus curing agents were produced.

Synthesis of Urethane Prepolymer 1

The urethane prepolymer 1 was synthesized by agitating 100 g of polycarbonate diol and 75 g of 4,4'-diphenylmethane diisocyanate (index: 3.0) in a nitrogen atmosphere at 80° C. for 4 hours to react.

Synthesis of Urethane Prepolymer 2

The urethane prepolymer 2 was synthesized by agitating 100 g of polycarbonate diol and 100 g of 4,4'-diphenylmethane diisocyanate (index: 4.0) in a nitrogen atmosphere at 80° C. for 4 hours to react.

Synthesis of Urethane Prepolymer 3

The urethane prepolymer 3 was synthesized by agitating 100 g of polycarbonate diol and 150 g of 4,4'-diphenylmethane diisocyanate (index: 6.0) in a nitrogen atmosphere at 80° C. for 4 hours to react.

Synthesis of Urethane Prepolymer 4

The urethane prepolymer 4 was synthesized by agitating 100 g of polycarbonate diol and 50 g of 4,4'-diphenylmethane diisocyanate (index: 2.0) in a nitrogen atmosphere at 80° C. for 4 hours to react.

For the polycarbonate diol and the 4,4'-diphenylmethane diisocyanate used in the production of the urethane prepolymers 1 to 4 described above, the following materials were used.

Polycarbonate Diol:
DURANOL T5651 (weight average molecular weight: 1000), available from Asahi Kasei Corporation
4,4'-Diphenylmethane Diisocyanate:
Millionate MT (molecular weight: 250), available from Tosoh Corporation In Tables, each value for the urethane prepolymers 1 to 4 shows a total amount of the urethane prepolymer (a1) and the residual polyisocyanate (a2). For the raw materials other than the urethane prepolymers 1 to 4 listed in Tables, the materials listed below were used. In Tables, the amount of a raw material is shown in parts by mass.

Carbon black: 200 MP, available from NSCC Carbon Co., Ltd.
Calcium carbonate 1: heavy calcium carbonate, Super S, available from Maruo Calcium Co., Ltd.
Plasticizer: diisononyl phthalate, available from J-PLUS Co., Ltd.
Polyol: polyol in which, to glycerin, PO(1,2-propylene oxide)-EO(ethylene oxide)-PO(1,2-propylene oxide) were block-added in this order), SANNIX GL-3000, available from Sanyo Chemical Industries, Ltd.
Polyamine: diethylmethylbenzenediamine, DETDA, available from Mitsui Fine Chemicals, Inc.
Calcium carbonate 2: light calcium carbonate, KALFAIN 200, available from Maruo Calcium Co., Ltd.
Silica: Reolosil QS-102, available from Tokuyama Corporation In Tables, "main agent (A): curing agent (B)" means a mass ratio of the main agent to the curing agent, and is represented by a ratio of which the total mass of the main agent and the curing agent is 2.

The produced main agent and curing agent were mixed in an equivalent ratio (NCO group/active hydrogen group ratio) shown in Tables, the strength at break and elongation at break were measured as described below to determine the strength at break index and elongation at break index described below, and the workable life and foamability were evaluated.

Strength at Break, Elongation at Break

Using a No. 3 dumbbell-shaped test piece, the tensile test was performed in accordance with JIS K6251 at a temperature of 20° C. at a crosshead speed (tensile speed) of 200 mm/min, and the tensile strength (strength at break) and the elongation at break were measured. The reference lines for elongation at break measurement were made at intervals of 20 mm. As the result of this, the case where the strength at break was 15 MPa or greater was evaluated as having excellent strength at break, and the case where the elongation at break was 150% or greater was evaluated as having excellent elongation at break.

Strength at Break Index, Elongation at Break Index

The strength at break and elongation at break of each of Examples 3 to 5 and Comparative Examples 1 to 3 were expressed as index values with cases where the main agent (A) and the curing agent (B) were mixed in equivalent amounts (Example 3 and Comparative Example 1) being assigned the value of 100. The index value was calculated by adding 100 to a percentage of change (%) of each of strength at break and elongation at break of Examples 4 and 5 and Comparative Examples 2 and 3 with respect to each of the strength at break and elongation at break of Example 3 and Comparative Example 1. As a result of this, a case where the index value was in between 80 to 120 was evaluated as suppressing the percentage of change of the strength at break and elongation at break to not greater than ±20% with respect to the strength at break and elongation at break of a case where the mixing ratio of the main agent (A) to the curing agent (B) was 1:1. In other words, such a case was evaluated as having minimal effect on the strength at break and elongation at break of the cured product even when the mixing ratio of the main agent (A) to the curing agent (B) is deviated from the set value.

Workable Life

The workable life was a time period from the time at which the main agent and the curing agent was mixed to the time at which handling became impossible, that is, at the time at which flowability as an adhesive was significantly lost. The case where the workable life was from 30 seconds to 10 minutes was evaluated as being suitable for use, that is, having an appropriate workable life.

Foamability

A cured product having a thickness of 2 mm was produced, and as foamability, presence of expansion of the surface of the cured product due to air bubbles and presence of air bubbles when a cross-section obtained by cutting the curing agent by a utility knife was observed were determined, and foamability when the main agent and the curing agent were mixed was evaluated. The case where no remarkable air bubbles were observed was evaluated as "A". The case where air bubbles were observed and where the number of the air bubbles was obviously large or large air bubbles having a diameter of greater than 1 mm were contained was evaluated as "C". The other cases were evaluated as "B". Of these, "A" was evaluated as suppressing foaming.

TABLE 1

|  |  | Examples | | | | |
|---|---|---|---|---|---|---|
|  |  | 1 | 2 | 3 | 4 | 5 |
| Main agent (A) | Urethane prepolymer 1 | 100 | | | | |
|  | Urethane prepolymer 2 | | 100 | | | |
|  | Urethane prepolymer 3 | | | 100 | 70 | 130 |
|  | Urethane prepolymer 4 | | | | | |
|  | Carbon black | 7.5 | 7.5 | 7.5 | 5.25 | 9.75 |
|  | Calcium carbonate 1 | 25 | 25 | 25 | 17.5 | 32.5 |
|  | Plasticizer | 37.5 | 37.5 | 37.5 | 26.3 | 48.7 |
| Curing agent (B) | Polyol 1 | 35 | 32.5 | 42.5 | 55 | 30 |
|  | Polyol 2 | | | | | |
|  | Polyamine | 22.5 | 17.5 | 15 | 20 | 10.5 |
|  | Calcium carbonate 2 | 100 | 100 | 100 | 130 | 70 |
|  | Silica | 12.5 | 12.5 | 12.5 | 16.3 | 8.8 |
| Total amount of main agent (A) | | 170 | 170 | 170 | 119.1 | 221 |
| Total amount of curing agent (B) | | 170 | 170 | 170 | 221.3 | 119.3 |
| Main agent (A):curing agent (B) | | 1:1 | 1:1 | 1:1 | 0:7:1.3 | 1.3:0.7 |
| Index | | 3 | 4 | 6 | 6 | 6 |
| NCO group/active hydrogen group ratio | | 0.8 | 1.3 | 2 | 3.55 | 1.03 |
| Workable life (min) | | 2 | 2.5 | 3 | 2 | 2.5 |
| Foaming performance | | A | A | A | A | A |
| Strength at break (MPa) | | 47 | 55 | 42 | 36 | 34 |
| Elongation at break (%) | | 210 | 200 | 170 | 141 | 200 |
| Strength at break index | | | | 100 | 85 | 81 |
| Elongation at break index | | | | 100 | 83 | 117 |

TABLE 2

|  |  | Comparative Examples | | |
| --- | --- | --- | --- | --- |
|  |  | 1 | 2 | 3 |
| Main agent (A) | Urethane prepolymer 1 | | | |
|  | Urethane prepolymer 2 | | | |
|  | Urethane prepolymer 3 | | | |
|  | Urethane prepolymer 4 | 100 | 70 | 130 |
|  | Carbon black | 7.5 | 5.25 | 9.75 |
|  | Calcium carbonate 1 | 25 | 17.5 | 32.5 |
|  | Plasticizer | 37.5 | 26.3 | 48.7 |
| Curing agent (B) | Polyol 1 | 65 | 85 | 45 |
|  | Polyol 2 | | | |
|  | Polyamine | 7 | 8.8 | 5 |
|  | Calcium carbonate 2 | 85 | 110 | 60 |
|  | Silica | 12.5 | 16.3 | 8.8 |
| Total amount of main agent (A) | | 170 | 119.1 | 221 |
| Total amount of curing agent (B) | | 169.5 | 220 | 119 |
| Main agent (A):curing agent (B) | | 1:1 | 0.7:1.3 | 1.3:0.7 |
| Index | | 2 | 2 | 2 |
| NCO group/active hydrogen group ratio | | 1 | 0.54 | 1.86 |
| Workable life (min) | | 20 | 30 | 30 |
| Foaming performance | | C | B | C |
| Strength at break (MPa) | | 13 | 10 | 18 |
| Elongation at break (%) | | 240 | 450 | 145 |
| Strength at break index | | 100 | 77 | 138 |
| Elongation at break index | | 100 | 188 | 60 |

From the comparison of Examples 1 to 5 and Comparative Examples 1 to 3, it was found that, with the adhesive composition containing a main agent having the urethane polyprepolymer (a1) manufactured by setting the index to 2.05 or greater and the residual polyisocyanate (a2) and containing a curing agent having the polyol compound (b1) and the polyamine compound (b2) and having the NCO group/active hydrogen group ratio set to 0.5 o 4, foaming is suppressed, appropriate length of workable life is achieved, and excellent strength at break and elongation at break of a cured product are achieved.

Furthermore, from the comparison of Examples 3 to 5 and Comparative Examples 1 to 3, it was found that the case where the index was 2.05 or greater exhibited a minimal effect on the strength at break and elongation at break of the cured product even when the NCO group/active hydrogen group ratio was changed in a range of 0.5 to 4.

The foregoing has been a description of the two-part curable adhesive composition according to embodiments of the present invention. However, the present invention is naturally not limited to the above embodiments and Examples and may be improved or modified in various ways within the scope of the present invention.

REFERENCE SIGNS LIST

1 Cured product
3 Microparticle
5 Continuous phase

The invention claimed is:

1. A two-part curable adhesive composition comprising a main agent (A) containing a urethane prepolymer (a1), and a curing agent (B) containing a polyol compound (b1) and a polyamine compound (b2),
the urethane prepolymer (a1) being made by reacting a raw material polyisocyanate and only a polycarbonate polyol as a reactant that is reacted with the raw material polyisocycnate in an equivalent ratio of an isocyanate group in the raw material polyisocyanate to a hydroxy group in the polycarbonate polyol being 2.05 or greater with all of the polycarbonate polyol turning to a monomer unit for the urethane prepolymer (a1) so that the monomer units included in the urethane prepolymer (a1) being only a monomer unit of the raw material polyisocyanate and the monomer unit of the polycarbonate polyol,
the main agent (A) further containing, in addition to the urethane prepolymer (a1), a residual polyisocyanate (a2) which is a remainder of the raw material polyisocyanate that did not react with the polycarbonate polyol,
an equivalent ratio of an isocyanate group in the main agent (A) to an active hydrogen group in the curing agent (B) being from 0.5 to 4, and
the adhesive composition comprising no catalyst.

2. The two-part curable adhesive composition according to claim 1, wherein an equivalent ratio of an active hydrogen group in the polyamine compound (b2) to an active hydrogen group in the polyol compound (b1) is from 1.5 to 6.

3. The two-part curable adhesive composition according to claim 1, wherein a number average molecular weight of the polycarbonate polyol is 500 or greater and 3000 or less.

4. The two-part curable adhesive composition according to claim 1, wherein a number average molecular weight of the polyol compound (b1) is 500 or greater.

5. The two-part curable adhesive composition according to claim 1, wherein the polyol compound (b1) contains at least one of a monomer unit of polyethylene glycol or a monomer unit of polypropylene glycol in each molecule.

6. The two-part curable adhesive composition according to claim 1, wherein the polyamine compound (b2) has a number average molecular weight of less than 500, and contains at least two amino groups and at least one aromatic group in each molecule.

7. The two-part curable adhesive composition according to claim 1, wherein the main agent (A) contains at least one selected from the group consisting of a filler, an anti-aging agent, a coloring agent, a viscosity modifier, and a plasticizer.

8. The two-part curable adhesive composition according to claim 1, wherein the curing agent (B) contains at least one selected from the group consisting of a filler, an anti-aging agents, a coloring agent, a viscosity modifier, a plasticizer, and polyhydric alcohols having a number average molecular weight of less than 500.

9. The two-part curable adhesive composition according to claim 1, wherein a cured product obtained by curing the two-part curable adhesive composition has a tensile strength of 15 MPa or greater, and an elongation at break of 150% or greater, as determined in accordance with JIS K6251.

10. The two-part curable adhesive composition according to claim 1, wherein a cured product obtained by curing the two-part curable adhesive composition has a modulus of elasticity in tension of 50 MPa or greater.

11. The two-part curable adhesive composition according to claim 1, wherein a mass ratio of the main agent (A) to the curing agent (B) is from 3:7 to 7:3.

12. The two-part curable adhesive composition according to claim 1, having a workable life of from 30 seconds to 10 minutes.

13. A two-part curable adhesive composition comprising a main agent (A) containing a urethane prepolymer (a1), and a curing agent (B) containing a polyol compound (b1) and a polyamine compound (b2),
the urethane prepolymer (a1) being made by reacting a raw material polyisocyanate and only a polycarbonate polyol as a reactant that is reacted with the raw material polyisocycnate in an equivalent ratio of an isocyanate group in the raw material polyisocyanate to a hydroxy group in the polycarbonate polyol so that the monomer units included in the urethane prepolymer (a1) being only a monomer unit of the raw material polyisocyanate and the monomer unit of the polycarbonate polyol, the equivalent ratio being adjusted such that a cured product obtained by curing the two-part curable adhesive composition has a tensile strength of 15 MPa or greater and an elongation at break of 150% or greater in accordance with JIS K6251, with all of the polycarbonate polyol turning to a monomer unit for the urethane prepolymer (a1), the main agent (A) further containing, in addition to the urethane prepolymer (a1), a residual polyisocyanate (a2) that is a remainder of the raw material polyisocyanate that did not react with the polycarbonate polyol, an equivalent ratio of an isocyanate group in the main agent (A) to an active hydrogen group in the curing agent (B) being from 0.5 to 4, and the adhesive composition comprising no catalyst.

14. The two-part curable adhesive composition according to claim 1, wherein a cured product obtained by curing the two-part curable adhesive composition consists of a first polymer phase obtained by adding the raw material polyisocyanate to the polycarbonate polyol and reacting with the active hydrogen group of the curing agent (B) and a second polymer phase obtained by reacting the residual polyisocyanate (a2) with the active hydrogen group of the curing agent (B).

15. The two-part curable adhesive composition according to claim 14, wherein the cured product has an islands-in-the-sea structure in which the first polymer phase is a dispersed phase and the second polymer phase is a continuous phase.

16. The two-part curable adhesive composition according to claim 1, wherein the equivalent ratio of the isocyanate group in the raw material polyisocyanate to the hydroxy group in the polycarbonate polyol is 4 or greater.

17. The two-part curable adhesive composition according to claim 1, wherein the adhesive composition comprises no organometal compound and no tertiary amine as a catalyst.

18. The two-part curable adhesive composition according to claim 13, wherein the adhesive composition comprises no organometal compound and no tertiary amine as a catalyst.

* * * * *